United States Patent [19]
Ransom

[11] Patent Number: 5,479,766
[45] Date of Patent: Jan. 2, 1996

[54] BALING APPARATUS AND METHOD

[76] Inventor: Woodbury S. Ransom, 14 Elm Rd., Bolinas, Calif. 94924

[21] Appl. No.: 271,327

[22] Filed: Jul. 6, 1994

[51] Int. Cl.$^6$ .......................... A01D 87/02; A01F 15/02; A01F 15/04
[52] U.S. Cl. ................ 56/341; 56/343; 56/432; 100/3; 100/35
[58] Field of Search .................... 56/341, 432, 433, 56/343; 100/3, 35, 100

[56] References Cited

U.S. PATENT DOCUMENTS

| | | | |
|---|---|---|---|
| 3,583,312 | 6/1971 | Van Doorn et al. | 100/90 |
| 3,828,535 | 8/1974 | Lundahl | 56/344 |
| 4,193,251 | 3/1980 | Oosterling et al. | 56/341 |
| 4,302,923 | 12/1981 | Molitorisz | 56/341 |
| 4,464,889 | 8/1984 | Weelink | 56/341 |
| 4,803,832 | 2/1989 | Crawford | 56/341 |
| 5,105,563 | 4/1992 | Fingerson et al. | 56/432 X |
| 5,299,684 | 4/1994 | Ransom | 206/83.5 |

Primary Examiner—Stephen J. Novosad
Attorney, Agent, or Firm—Jenner & Block

[57] ABSTRACT

A baling apparatus is provided for forming large rectangular bales of fibrous material. The apparatus includes a rectangular bale chamber having an inlet for receiving baling material beneath the bale chamber and an outlet for discharging completed bales at the top of the bale chamber. Balable material is gathered from the surface of the field of by the pickup mechanism, formed into a mat by clamping rollers and transported toward the bale chamber by a conveying mechanism. A conveyor sweep apparatus detaches a segment of the mat on the conveyor and feeds it to a compressing mechanism located beneath the bale chamber inlet. The clamping rollers ensure that the mat separates cleanly when engaged by the sweep apparatus. The compressing structure then compresses the segment of baling material in a slow upward compression stroke into the bale chamber inlet. As a result, a rectangular bale comprising successive horizontal layers is formed within the bale chamber. A dedicated structure is provided for tying completed bales within the bale chamber and discharging the bales onto the surface of the field.

27 Claims, 14 Drawing Sheets

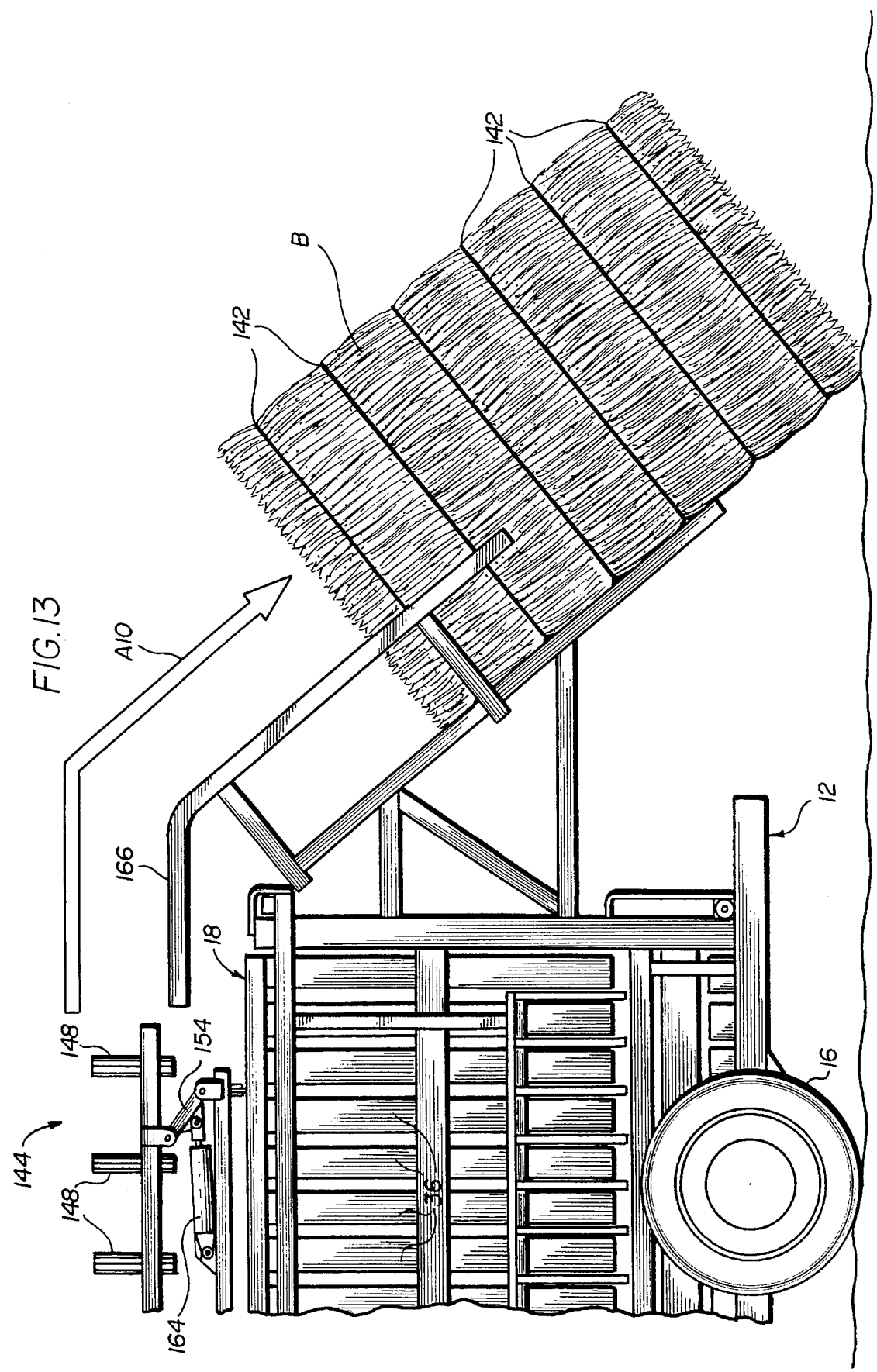

BALING APPARATUS AND METHOD

FIELD OF THE INVENTION

The present invention relates to an apparatus and method for baling materials. More specifically, the present invention relates to a device and method for forming large rectangular bales having a high bale density.

BACKGROUND OF THE INVENTION

Baling apparatus for forming large bales of crop or other fibrous materials are well known today. Although balers of many designs have been in use for a number of years, mobile balers which produce large round or rectangular bales are a relatively recent development. A typical mobile baler operates continuously, gathering balable material that lies in a windrow on the surface of a field, compacting the material into a bale within a bale chamber and tying and discharging the completed bale in the field.

A primary concern of the designer of a baler mechanism is the expense of shipping and storing completed bales. In order to minimize the amount of space required to store completed bales, it is highly desirable that the bale have a high density in pounds of material per cubic foot. In addition, because round bales tend to roll and are more difficult to handle and store than rectangular bales, rectangular bales are generally preferred over round bales.

It is believed that the even distribution of material in each layer of the bale has an important effect on bale density. One of the advantages found in round balers is that they add layers of material simply by "rolling up" material from the field without disturbing the windrow. In addition, each new layer of material in a round bale is evenly compressed. As a result of this gentle handling and uniform compression, the layers of material in round bales is of relatively even distribution. In contrast, many typical rectangular balers tear sections of material from the incoming windrow and compress the sections into the bale chamber using a horizontal ram. This can result in a relatively uneven distribution of material in each layer of the bale. Therefore, round balers tend to produce higher density bales than typical rectangular balers per unit of compressive force applied.

Prior attempts to overcome these disadvantages have not been entirely successful. For example, in one approach to rectangular baling, the windrow is gathered into a reciprocating chute or conveyor forming bales with layers having a zig-zag pattern. Such a baling apparatus is described in U.S. Pat. No. 4,803,832 to Crawford. Alternatively, the gathered windrow can be transported vertically into an oscillating bale chamber as in U.S. Pat. No. 4,302,923 to Molitorisz. Although these designs improve material distribution in each layer of the bale, bale density is not greatly improved because compressive force is not uniformly applied to each layer. In these designs, a relatively small diameter compression roller traverses each new layer of material as it is added to the bale. It is believed that because only a relatively small area of each layer is subject to high compressive forces at any one time, the area not being compressed may "rebound" resulting in a loss of compression and a decrease in bale density. Moreover, such "roller packing" is conducive to leaf shattering and the resultant loss of protein of the baling material.

Therefore, a need exists for a baler and baling method that is capable of forming large rectangular bales having a high bale density while minimizing leaf shattering and protein loss. A need also exists for a rectangular baler that can produce high density bales having minimum power requirements that is relatively simple in design and operation.

SUMMARY OF THE INVENTION

In accordance with the present invention, an improved baling apparatus and method is provided which overcomes the limitations of the prior art. More specifically, a baling apparatus of non-complex design is provided which has modest power requirements and which is capable of producing a rectangular bale with a specific density of well above 14 pounds per cubic foot.

In accordance with the present invention, the baling apparatus includes a bale chamber with a material receiving inlet located at the bottom of the chamber and an outlet for discharging bales located at the top of the chamber. The baling apparatus provides a delivery mechanism for feeding balable material to a compressing structure adjacent to the material receiving inlet of the bale chamber. The compressing structure compresses the material through the bale chamber inlet. As a result, successive horizontal layers of baling material are formed within the bale chamber. A supporting structure is also provided to support the bottom layers of the bale.

In accordance with one embodiment of the present invention, the baling apparatus forms large rectangular bales of balable material and includes a bale chamber having a rectangular cross section. In the preferred embodiment, the delivery structure includes a pick-up and conveyor mechanism for gathering balable material and transporting a mat of the material toward the bale chamber. A sweep mechanism engages and feeds a section of the mat to an area below the material receiving inlet of the bale chamber. During the operation of the baling apparatus, the detached section of the mat which is to be compressed remains oriented parallel with the surface of the field. This has the effect of maintaining the integrity of the windrow which helps to ensure an even distribution of each layer of material in the bale.

The compressing structure located beneath the receiving inlet of the bale chamber comprises a ram with a flat surface for receiving the mat of balable material. The compressing ram moves upward in a compression stroke compressing the balable material against the bottom of the bale within the bale chamber. This gentle handling helps to minimize leaf shattering and feed value loss. Moreover, higher density bales are produced because compression is uniform across the face of the bale and because of the relatively even distribution of the hay to be compressed.

The supporting structure includes moveable gates that alternatively open to a non-support position and close to a support position. The gate movement is synchronized with the operation of the compressing structure such that the supporting gate opens just before the new layer of material on the compressing structure engages the bottom of the gate and closes before the compressing structure begins its downward retraction stroke.

The baling apparatus of the present invention provides for continuous baling operation. During the formation of a first bale in the bale chamber, the bale chamber outlet is blocked by a moveable restraint. When the first bale has reached a desired density, the restraint is opened and the first bale is pushed out of the bale chamber outlet by the upward movement of the next bale being formed within the bale chamber. The baling apparatus typically will also include a suitable mechanism for tying completed bales within the bale chamber. Thereafter, tied bales are continuously discharged to the surface of the field by a discharge mechanism while the baling apparatus continues to traverse the surface of the field.

In accordance with another aspect of the present invention, a method of forming bales of balable material such as hay, or other crop material or paper, for example, is provided. The method includes the step of forming a mat of balable material and delivering a segment of the mat to an area beneath a bale chamber having an inlet for receiving the balable material in its lower portion. Preferably, the mat is transported essentially parallel with a row of baling material laying on a surface. The segment of balable material is then compressed into a substantially horizontal layer that upon compression becomes part of the bale being formed in the bale chamber. Finally, after the compression of a new layer of material is completed, any compressed layers in the chamber are supported from beneath. These steps are repeated until the bale reaches a desired height.

When the bale is completely formed, the bale may be tied in the bale chamber and subsequently discharged into the field. In accordance with the invention, a new bale may be formed in the bale chamber after the last completed bale has been tied and while the last bale remains in the bale chamber.

Other advantages and features of the invention will be apparent from the following description and from the drawings.

BRIEF DESCRIPTION OF THE DRAWINGS

FIG. 13 is a partial side elevation view of the baler illustrating the bale discharge ramp.

DETAILED DESCRIPTION OF THE PREFERRED EMBODIMENT

Figure 1:
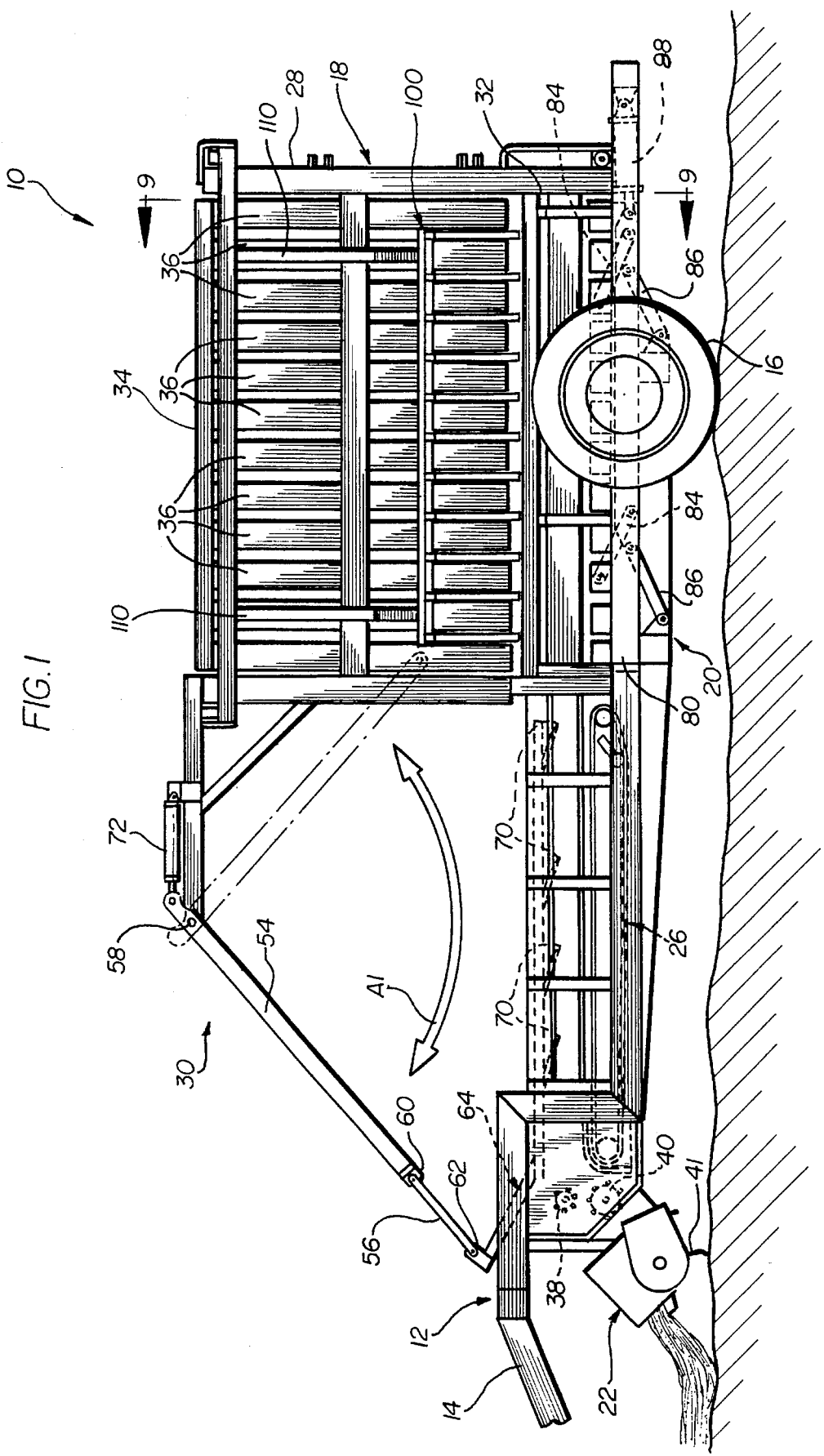
FIG. 1 is a side elevation view of a baler in accordance with the present invention, with a portion of the front baler frame being omitted.

FIG. 1 illustrates a baler 10 for mobile use drawn by a tractor or other vehicle across a field of cut, windrowed fibrous agricultural crops such as hay or straw. Baler 10 includes a frame 12 that has mounted thereto a forwardly extending tongue 14 for attachment to a tractor draw bar (not shown). Secured to frame 12 are ground traversing wheels 16. While the particular embodiment shown is tractor drawn, it is to be understood that the invention could also be utilized as a self-powered device incorporating a propulsion mechanism. In addition, the invention is capable of applications other than agricultural uses. For example, the invention is equally suitable for baling other non-agricultural products, such as paper and refuse.

In the illustrated embodiment, baler 10 forms large rectangular bales of balable material. For example, baler 10 can form rectangular bales of hay measuring up to 4 feet by 8 feet by 6 feet. The bale height can be varied between two and six feet in accordance with the invention as described below. Furthermore, the large rectangular bales produced by baler 10 have a high density of baling material per unit bale volume. Tests show that where the baling material is alfalfa hay having 15% moisture content, the density of bales made by the apparatus of the present invention can be up to 17 pounds per cubic foot or more.

As illustrated in the FIGS., the baling apparatus of the present invention includes a rectangular bale chamber 18 and a compressing structure 20 for compressing loose baling material into horizontal layers of a rectangular bale B being formed within bale chamber 18. Balable material is gathered from the surface by a material pick up mechanism 22, and a conveying 26 mechanism and delivery mechanism 30 feed the balable material to compressing structure 20. After the material is compressed into a new horizontal layer of bale B, a supporting gate structure 100 supports the bottom layers of bale B. When bale B has reached a desired height, a tying and knotting system 130 automatically ties the completed bale within bale chamber 18. Subsequently, a bale discharge mechanism 144 removes the tied bale from the top of bale chamber 18 and deposits it on a discharge ramp 166.

Figure 5:
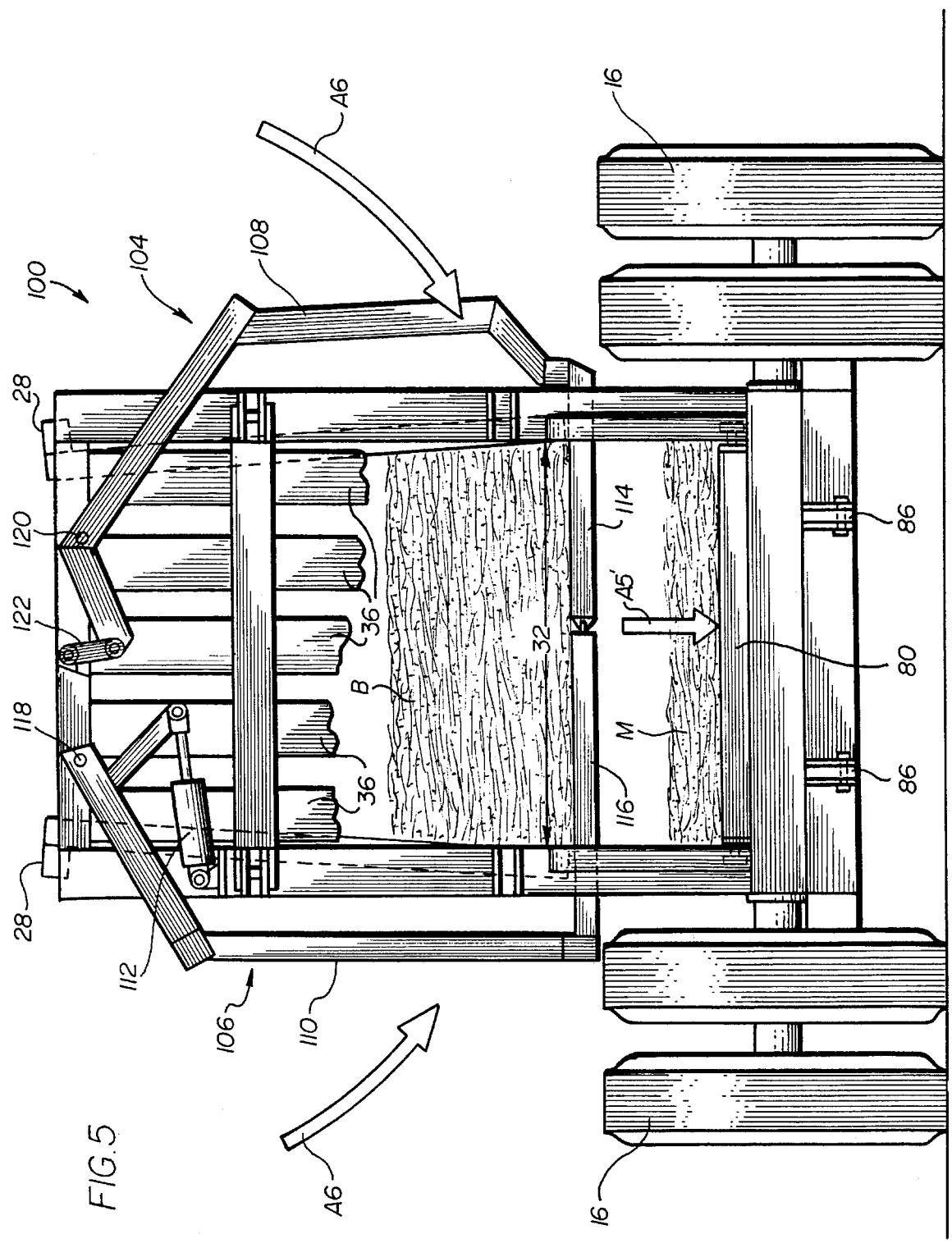
FIG. 5 is a partial rear elevation view of the baler illustrating the supporting structure in its closed or support position.

The various components of bale chamber 18 are best illustrated in FIG. 1. Bale chamber 18 is substantially rectangular in transverse cross section with an inlet port 32 for receiving the material to be baled at the bottom of bale chamber 18, and an outlet port 34 for removing completed bales at the top of bale chamber 18. Side walls 28 of bale chamber 18 are composed of spaced apart slats 36. Preferably, inside walls 28 of bale chamber 18 taper inward slightly (about 2 inches, for example), as best seen in FIG. 5, from top to bottom to provide increased resistance to bale discharge to assist in compacting. The taper can be adjustable in a known manner to provide more or less resistance to discharge for different types of or variations in baling materials.

Figure 2:
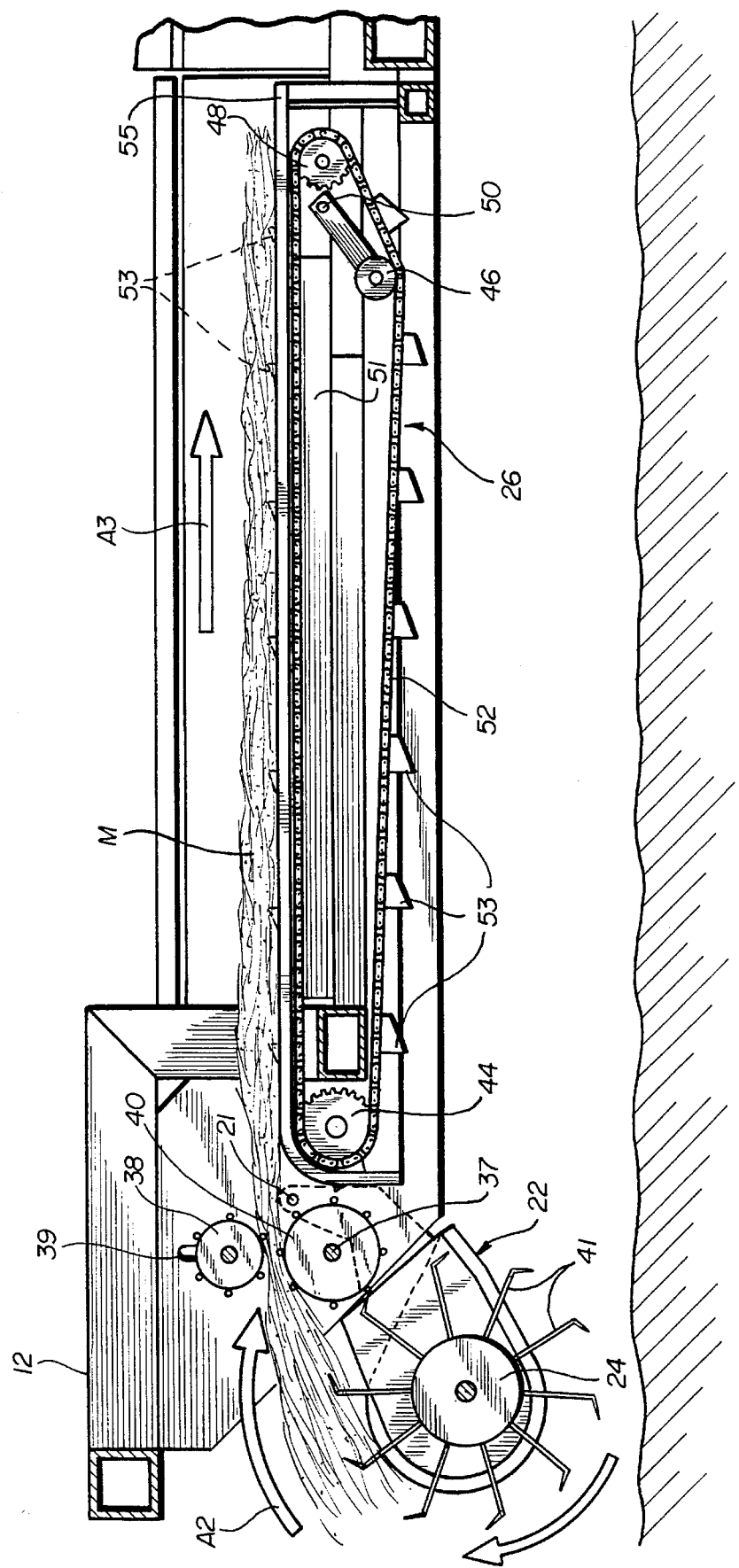
FIG. 2 is a partial side elevation view of the baler illustrating the conveyor and material pickup mechanisms.

Referring to FIGS. 1 and 2, forward of bale chamber 18, is a material pick-up 22 and conveyor mechanism 26 that gathers baling material from the surface of the field, forms the material into a substantially horizontal mat M and transports mat M toward bale chamber 18 as shown by arrows A2 and A3 in FIG. 2. As described below, pick-up 22 and conveyor 26 form and transport mat M toward compressing structure 20 while substantially maintaining the integrity of the material windrow. As a result, after a segment of mat M is compressed, there is a more even distribution of material in each new layer of the bale which is an important factor in increasing bale density.

In the illustrated embodiment, pick-up mechanism 22 is mounted to the front bottom section of frame 12. Pick-up mechanism 22 pivots about point 21 with respect to frame 12 so that mechanism 22 can traverse uneven field surfaces. Pick-up mechanism 22 includes a rotatable drum 24 of a sufficient width to accommodate the width of a windrow of crop material on the surface of the field. A plurality of pick-up tines 38 extend from drum 24 for picking up the baling material as drum 24 rotates. Drum 24 can be driven in a known manner by a tractor power take-off (not shown) so that drum 24 rotates in a clockwise direction as baler 10 is pulled across the field by a tractor (not shown). Mechanism 22 is a conventional crop pick-up mechanism and is therefore not described in detail. Any suitable crop pick-up mechanism for delivering balable material can be utilized.

In addition, various modifications to pick-up mechanism 22 may be made as desired. For example, modifications can be made to accommodate a wider windrow, which is desirable to help ensure a full fill across the bale chamber from side to side at each layer, thus avoiding a loaf-shaped bale. This may be accomplished by providing baler 10 with a rotatable rake wheel on either side of pick-up mechanism 22 for gathering windrows wider than the width of drum 24. Such rake wheels and mounting structure are well known and therefore are not described in detail. Alternatively, a wider pick-up may be used with a short stub auger or other mechanism on either side just behind the pick-up mechanism to gently compress the windrow to the width of conveyor 26.

A pair of clamping rollers 38 and 40 extend across the width of conveyor 26 and are mounted rearwardly and slightly above pick-up mechanism 22. Rollers 38 and 40 clamping the baling material gathered by pick-up mechanism 22 forming a horizontal mat M that is then fed to conveyor 26. Lower roller 40 is mounted for rotation about a fixed bearing 37 and upper roller 38 is mounted to arm 39 that allows upper roller 38 to accommodate mats of varying thickness. Rollers 38 and 40 are driven in a known manner by a chain that is connected to a drive sprocket on conveyor 26 so that the rollers rotate at approximately the same rate as pick-up mechanism 22. As a result, rollers 38 and 40 clamp mat M so that it pulls apart cleanly when mat M is engaged and accelerated rearward by delivery mechanism 30 as discussed below.

Conveyor 26 extends rearwardly towards bale chamber 18 from clamping rollers 38 and 40 and is horizontally oriented with respect to frame 12. Conveyor 26 includes a driven endless chain bed 52 for carrying mat M of hay to bale chamber 18. Chain bed 52 traverses a pair of large front guide sprockets 44 and a pair of smaller rear sprockets 46 and 48. Rear sprockets 46 are mounted to spring-biased tensioners 50 which pivot at a point fixed to frame 12 for maintaining tension in chain bed 52 during operation of conveyor 26. The top section of chain bed 52 is supported by oak rails 51. In addition, chain bed 52 includes several cross bars (not shown) which carry a plurality of teeth 53. Teeth 53 extend upward through slots in the conveyor floor 55 and thus engage the bottom of mat M and move it rearward. Teeth 53 have a sloping trailing edge to promote the clean separation of mat M as it is engaged and accelerated rearward by delivery mechanism 30 as discussed below. Chain bed 52 can be driven in a conventional manner by a chain driven by a drive shaft that is suitably connected to a tractor power take-off (not shown).

Figure 3:
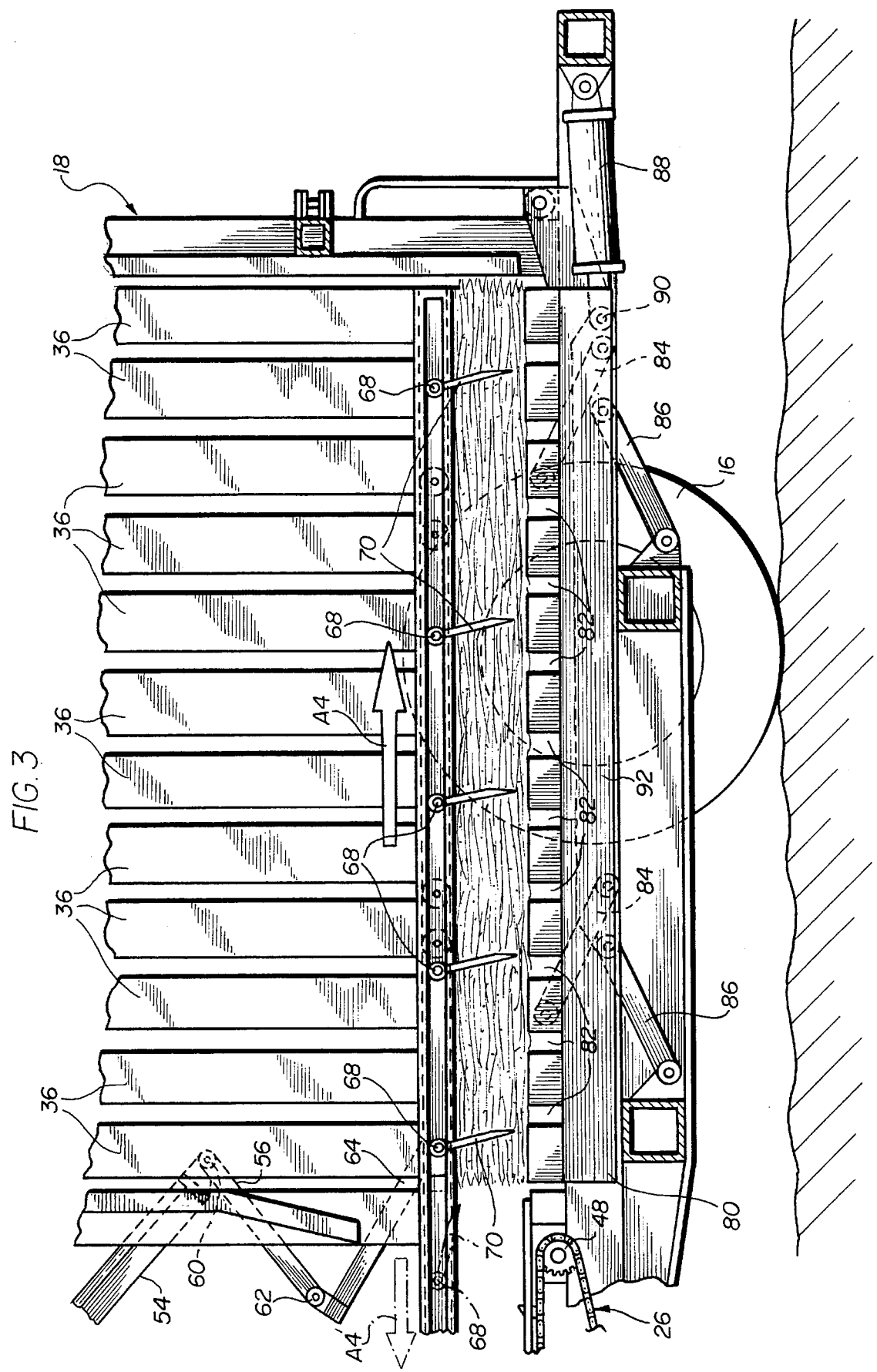
FIG. 3 is a partial side elevation view of the bale chamber of the baler illustrating the delivery means and the compressing structure.

In accordance with the present invention, material delivery mechanism 30 is provided to separate a rear segment of baling material from mat M traveling on conveyor 26 and deliver the segment to compressing mechanism 20 adjacent to bale chamber inlet 32. As illustrated in FIGS. 1 and 3, delivery mechanism 30 includes a pair of parallel elongated members 54 that pivot about points 58 at the top of each side of frame 12 (only one of which is shown in FIG. 1). Members 54 provide a sweeping movement towards bale chamber 18 as shown by arrow A1 in FIG. 1. A pair of short linkages 56 are attached to each elongated member 54 at pivot points 60 at one end and to a conveyor sweep mechanism 64 at pivot points 62 at the other end. As best seen in FIG. 3, conveyor sweep 64 has a plurality of pivoting rods 68 extending across the width of conveyor 26 from which extend a plurality of prongs 70 for engaging from above mat M moving on conveyor 26.

Delivery mechanism 30 is actuated by a pair of hydraulic cylinders 72 located on the top of either side of frame 12 (only one of which is shown in FIG. 1). When cylinders 72 are pressurized, a piston rod moves horizontally away from bale chamber 18 causing elongated members 54 to move in a circular arc (as illustrated by arrow A1 in FIG. 1) about pivot points 58. As the elongated members move toward bale chamber 18, linkages 56 pivot about upper points 60 and lower points 62 providing a linear, horizontal movement of conveyor sweep 64 as shown by arrows A4 and A4' in FIG. 3.

As the conveyor sweep 64 begins its rearward movement (in the direction of arrow A4), the weight of prongs 70 and the shape and orientation of the prong tips cause prongs 70 to engage the baling material on conveyor 26 and pivot further downward as sweep 64 carries a segment of mat M rearward. At the end of its rearward movement, conveyor sweep 64 is positioned within a compression chamber beneath bale chamber inlet 32 as shown in FIG. 3. When sweep 64 begins its return movement (in the direction of arrow A4'), prongs 70 pivot upward leaving mat M beneath the bale chamber inlet. While in its original, non-actuated position and as sweep 64 withdraws from beneath bale chamber 18, the force of any new material moving on conveyor 26 keeps prongs 70 pivoted in a non-engaging position as illustrated in FIG. 1. A simple linkage (not shown) can be used to latch prongs 70 in the down position during the sweep's rearward movement. The latching mechanism prevents any dry and slippery baling material from sliding too far to the rear of the compression chamber as sweep 64 decelerates near the end of its rearward movement. The latches release prongs 70 allowing them to pivot upward before sweep 64 begins its return stroke.

The operation of the compressing mechanism 20 is best illustrated in FIGS. 3 through 6. Compressing mechanism 20 includes a vertical ram 80 that moves in a compression stroke up into bale chamber inlet 32 and a retraction stroke down away from bale chamber inlet 32 as shown by arrows A5 and A5', respectively. Ram 80 has a flat surface with slots 82 along the width of the ram for the insertion of supporting gate fingers as described below. Ram 80 compresses the baling material delivered to the bale chamber inlet by delivery mechanism 30 onto the bottom of bale B being formed within bale chamber 18. As a result, bale B consists of substantially horizontal layers of baling material as it is gradually formed and moved upward within bale chamber 18.

Figure 4:
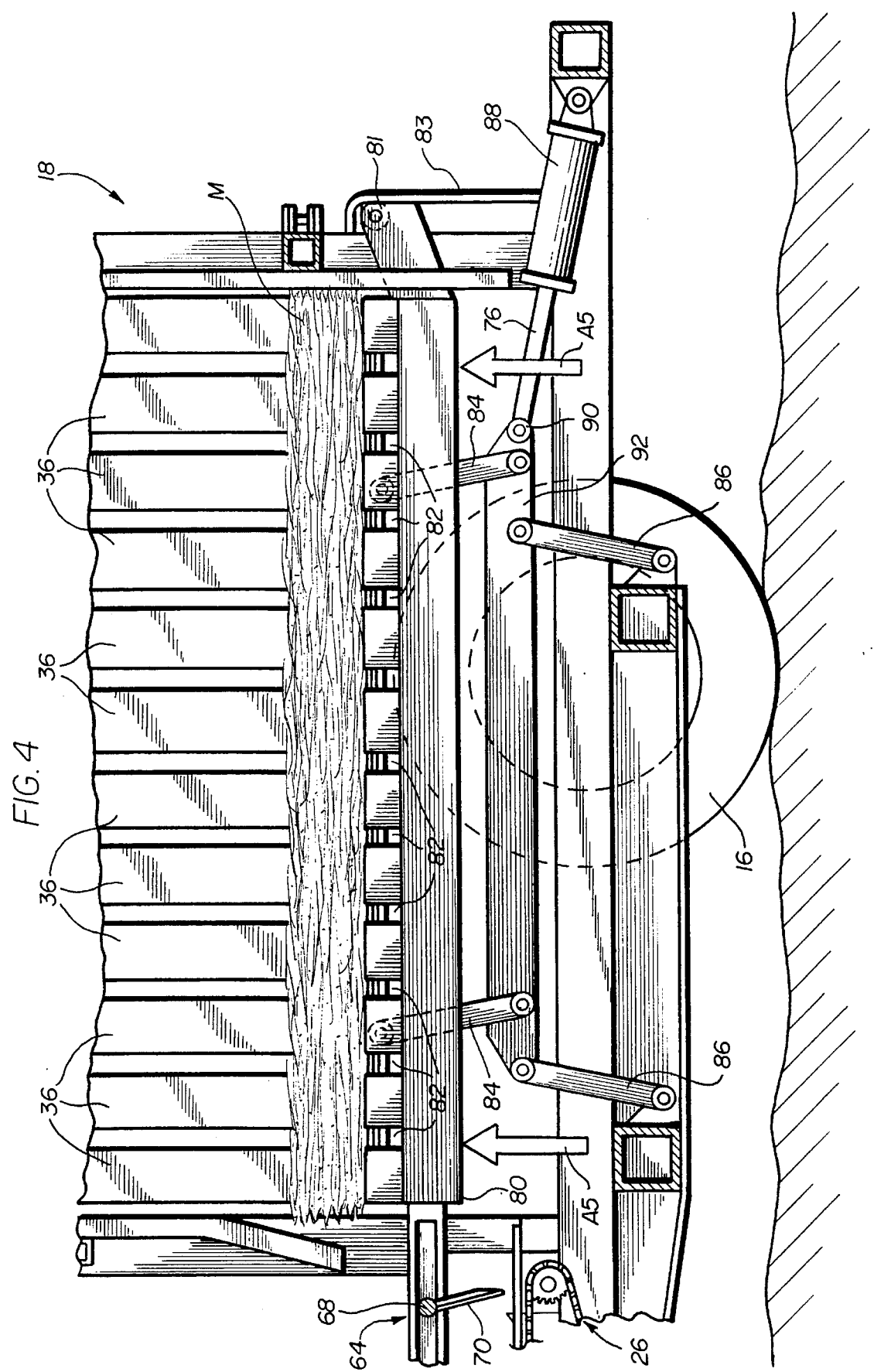
FIG. 4 is a partial side elevation view of the bale chamber similar to FIG. 3 but illustrating the operation of the compressing structure in its upward most position.

Ram 80 is mounted for pivotal movement with respect to frame 12 via mounting bars 92 which are positioned between frame 12 and ram 80 by linkage pairs 84 and 86, respectively. Ram movement is actuated by a pair of hydraulic cylinders 88. During the compression stroke of ram 80, cylinder stems 96 extend as illustrated in FIG. 4 exerting lateral forces at point 90 and causing linkage pairs 84 and 86 to pivot. As a result, ram 80 moves vertically upward into bale chamber inlet 32 in the direction indicated by arrow A5. Ram 80 exerts an essentially uniform force over the face of ram 80 as it compacts a new horizontal layer of material baling onto the bottom of bale B forming within bale chamber 18. During the retraction stroke, cylinder stems 96 retract pulling both pairs of linkages 84 and 86 back to their original positions thus lowering ram 80 out of bale chamber inlet 32. Ram 80 is constrained to vertical motion only by the action of rollers 81 moving within tracks 83.

It is an important advantage of the present invention that the mechanism described herein minimizes disruption of the windrow of baling material as the baling material is gathered and formed into mat M and as a segment of mat M is compressed within bale chamber 18. Moreover, the compressing mechanism 20 provides substantially uniform compression across the face of bale B as the baling material is compressed with great force. Therefore, the baling apparatus of the present invention produces high density bales having a relatively even distribution of material within each layer. Furthermore, where the baling material is alfalfa, this gentle handling minimizes the damage to the leaves of the baling material which contain most of its protein.

Figure 6:
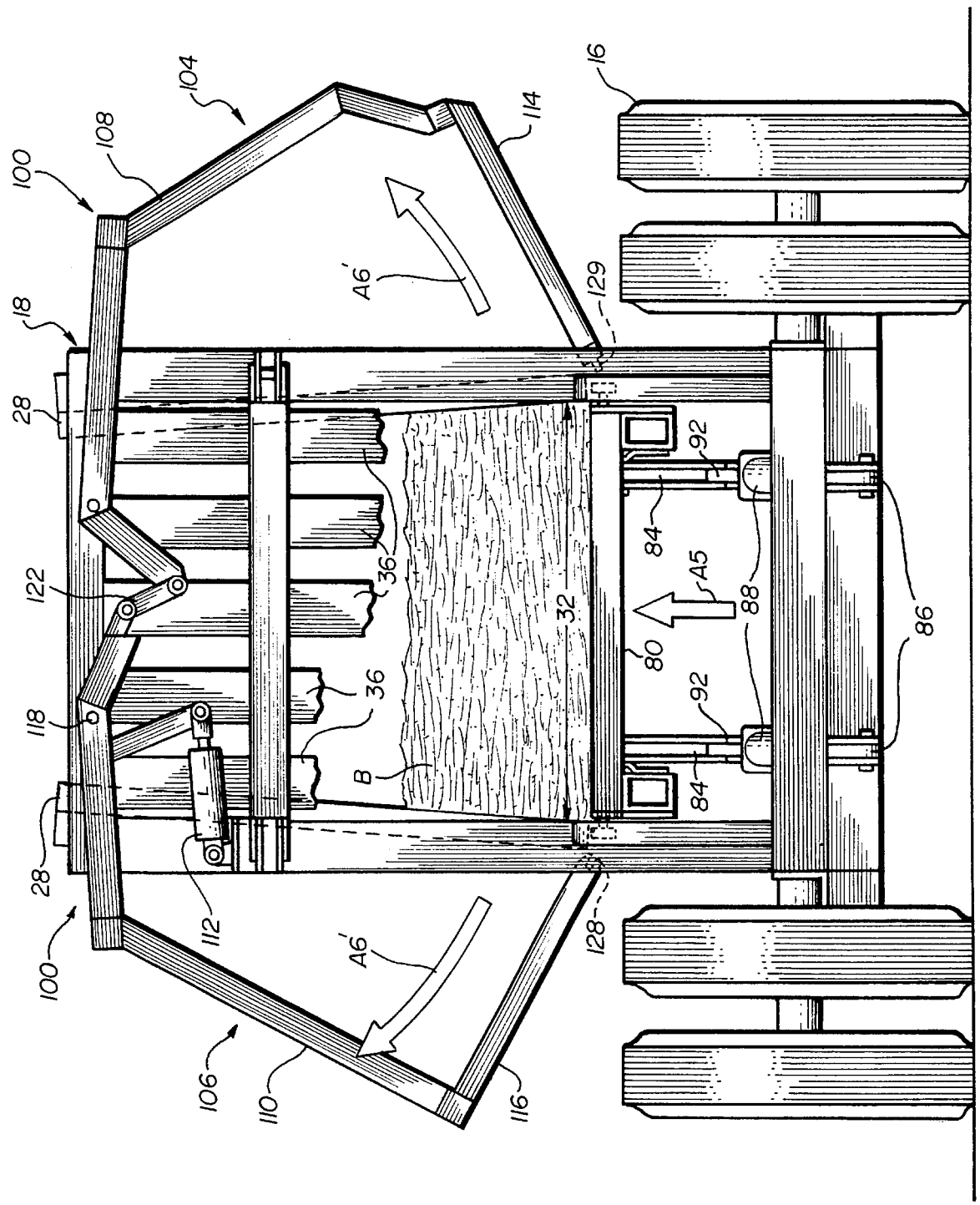
FIG. 6 is a partial rear elevation view of the baler similar to FIG. 5 but illustrating the supporting structure in its open or non-support position.

Baler 10 also includes a supporting structure 100 for supporting the bottom layers of bale B when ram 80 is in the retracted position. As best illustrated in FIG. 5 and 6, the supporting structure 100 includes a left gate section 106 and a right gate section 104, each gate section containing a row of parallel fingers 116 and 114, respectively, which extend approximately half-way across the width of bale chamber 18 at inlet 32. Each row of fingers 116 and 114 is connected to arm pairs 110 and 108, respectively, which are mounted for pivotal movement at points 118 and 120 along the top of the front and rear of bale chamber 18 (only one of which is shown in FIGS. 5 and 6). In its support position, both left and right gate sections 106 and 104 are at their bottom positions with gate fingers 116 and 114 nearly meeting at the center of bale chamber 18, as shown by arrows A6 in FIG. 5. In this position, fingers 116 and 114 provide support for the bottom layers of bale B forming within bale chamber 18. In its non-support position as shown in FIG. 6, arms 108 and 110 have pivoted away from bale chamber 18, as indicated by arrow A6', moving gate fingers 116 and 114 away from bale chamber inlet 32. An actuating mechanism is included to move gate sections 104 and 106 between their support and non-support positions. In the illustrated embodiment, the actuating mechanism comprises a pair of hydraulic cylinders 112 located on the front and rear of bale chamber 18 which exert lateral forces on arm pairs 108 causing arms 108 to rotate about pivot point 118. Arms 108 are connected to arms 110 by links 122 so that both support arm pairs 108 and 110 move together when cylinders 112 are actuated.

As shown in FIG. 5 and 6, the movement of the support structure 100 and compressing mechanism 20 are coordinated to provide, alternatively, compression and support for each new layer of baling material added to the bottom of bale B. Gates sections 104 and 106 remain closed while ram 80 begins its compression stroke and open only when the baling material carried by ram 80 begins to approach the bottom of gate fingers 116 and 114. After gate sections 104 and 106 open, ram 80 compresses the baling material onto the bottom of the bale in bale chamber 18. When ram 80 reaches its maximum upward travel, gate sections 104 and 106 close and gate fingers 116 and 114 slide within slots 82 in the surface of the ram 80. After gate sections 104 and 106 are completely closed, ram 80 begins its retraction stroke. As a result of these coordinated movements, the bottom layer of material in bale chamber 18 is almost continuously supported. It should be noted, however, that much of the weight of bale B is supported by friction created by contact with inside walls 28 of bale chamber 18.

Figure 7:
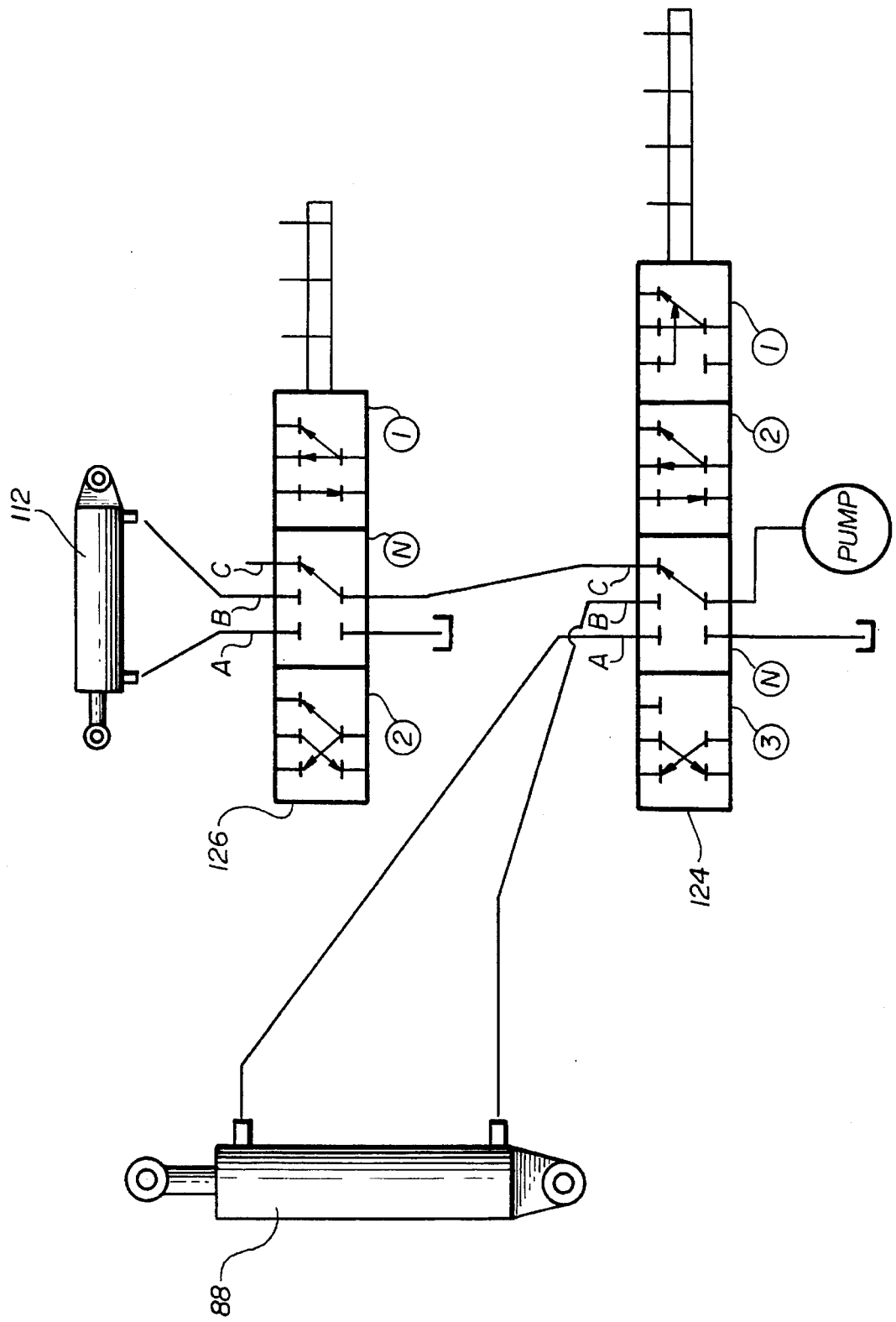
FIG. 7 is a hydraulic schematic of the support structure and compressing structure synchronization system.

The coordinated actuation of ram cylinders 88 and gate cylinders 112 is provided by two hydraulic valves, 124 and 126, connected in series as shown schematically in FIG. 7. Each valve has three outlet ports, one inlet pressure port and a port connected to an oil sump. Outlet port A and B of valve 124 are each connected to one side of each ram hydraulic cylinder 88 and outlet port C is connected to the inlet port of hydraulic valve 126. The outlet ports A and B of valve 126 are, in turn, connected to each side of the gate cylinder 112 and outlet port C is connected to subsequent hydraulic valves which control the operation of other subsystems of baler 10.

Initially, before either mechanism is activated, both valve 124 and 126 are in neutral positions as shown in FIG. 7. To activate ram 80, valve 124 is switched to regenerative position 1 so that oil flows through port A to the extension side of each ram cylinder 88 and the return oil from cylinders 88 flows through port C to gate valve 126. In regenerative mode, a large volume of hydraulic fluid flows to cylinders 88 which cause ram 80 to move upward at maximum speed and with minimum force. At this time, gate valve 126 remains in its neutral position and the gate sections 104 and 106 remain in their closed, or support, positions. After ram 80 has travelled approximately one-half of its compression stroke, valve 124 remains in regenerative position 1 while gate valve 126 is switched to position 2 which causes ram 80 to decelerate and the gate sections 104 and 106 to open. After gate sections 104 and 106 reach their fully open or nonsupport position, valve 124 switches to position 2 and gate valve 126 is switched to its neutral position. In this position, a smaller volume of high pressure fluid is supplied to ram cylinders 88 as ram movement slows and a new layer of baling material is compacted onto the bottom of bale B with maximum force. When the compression stroke is completed, ram valve 124 switches to neutral and gate valve 126 switches to position 1 which closes the gates while the ram 80 remains fully engaged. After the gates have completely closed, ram valve 124 switches to position 3 and gate valve 126 switches to neutral so that ram 80 begins its retraction stroke.

It is to be noted that although each of the systems of baler 10 is described and illustrated as having hydraulic drive apparatus, other drive mechanisms can be employed. For example, the drive mechanism for ram 80 and support structure 100 could be entirely mechanical comprising drive shafts with a series of cams for coordinated movement.

Advantageously, the supporting structure 100 also includes apparatus for use with a tying and knotting system 130 to provide automatic tying and knotting of completed bales within bale chamber 18. As illustrated in FIGS. 8A–8E and FIG. 9, tying and knotting system 130 includes a twine supply 132, a knotter which includes a knotter shaft 134, twine disks 136, bill hooks 137 and a set of parallel twine hooks 138, one for each strand of twine 142 which will tie the completed bale. Twine hooks 138 are connected to two drive arms 140 on the front and rear of bale chamber 18

Figure 9:
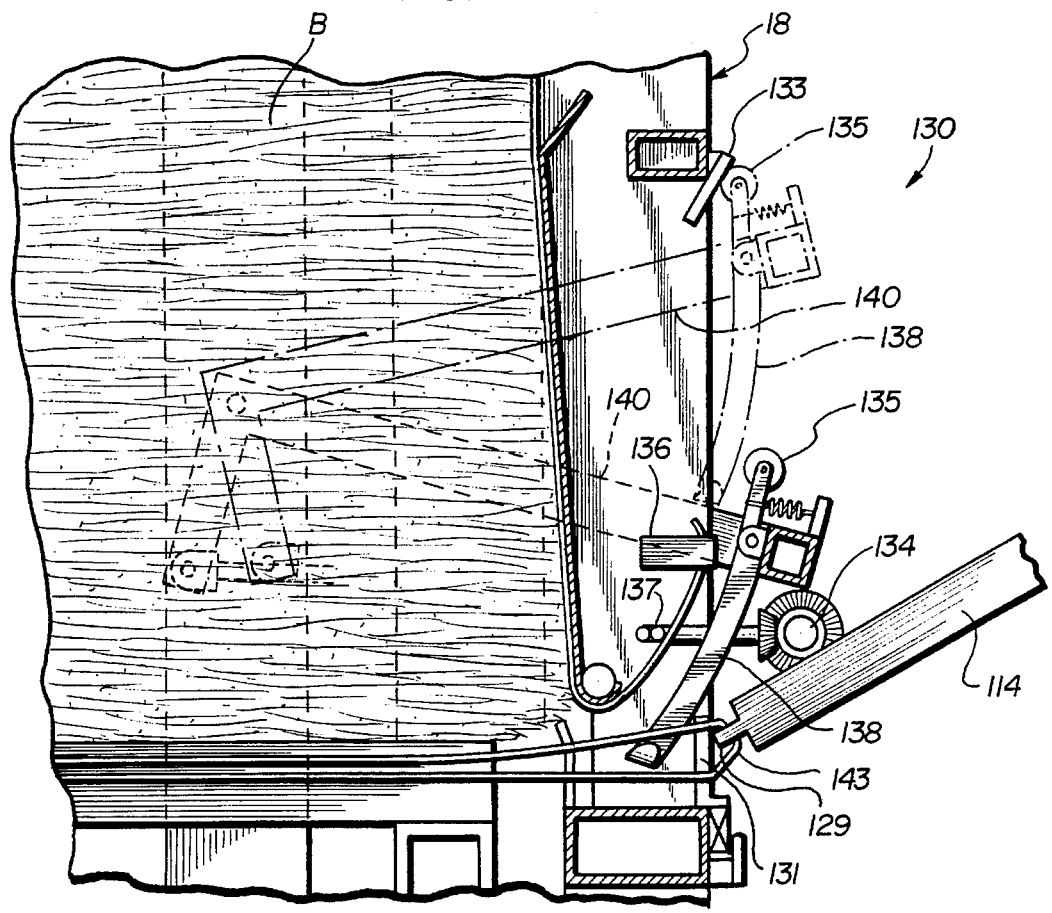
FIG. 9 is a partial sectional view along lines 9—9 of FIG. 1 of the rear of the baler illustrating the tying and knotting system.

(only one drive arm 140 and twine hook 138 being shown in FIG. 9). Drive arms 140 can be driven in a conventional manner by links to cranks and clutches (not shown) on the front and rear of knotter shaft 134. In addition, the ends of gate fingers 116 and 114 have a set of hooks 129 and engagers 128 for threading twine strands 142 across the bale chamber inlet, and hence around completed bale B.

The operation of knotting system 130 is best understood with reference to the sequence illustrated in FIGS. 8A–8E. As bale B is forming within bale chamber 18, separate strands of twine 142 are pulled across the top and along two sides of the bale. As material is compacted into bale chamber 18, additional twine is fed from twine supply 132 through twine guides 139. When bale B is completed, right and left side gate fingers 116 and 114 thread twine strands 142 in a loop 143 across the bale chamber inlet to knotting system 130. At this time, a gang bar, which has one protruding finger (not shown) for each twine strand 142, slides twine strands 142 into the path of left side gate fingers 116 where an engager 128 pushes twine loops 143 through to the center of bale chamber inlet 32. Right side gate fingers 114 are equipped with hooks 129 that mate with the engagers 128 of the left side gate fingers 116. When the gate sections 104 and 106 are opened, hooks 129 on right side gate fingers 114 pull twine loops 143 to the opposite side of bale chamber 18.

Figures 8A, 8B:
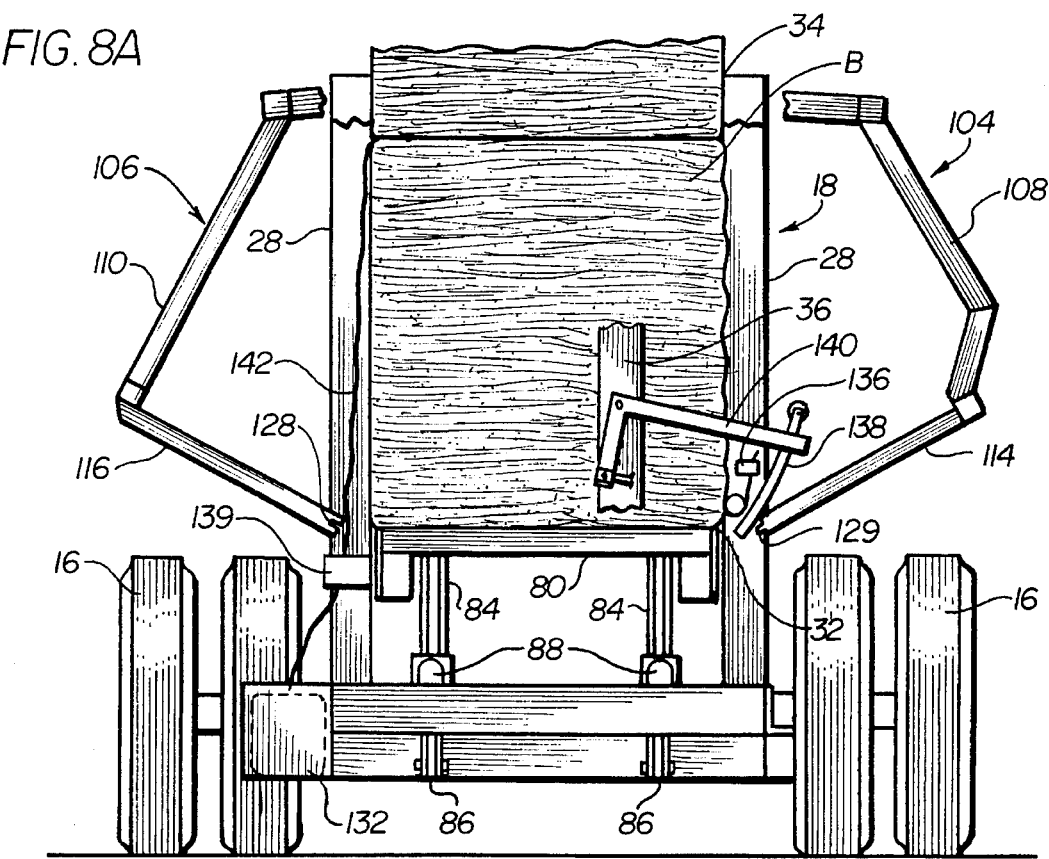
FIG. 8A, 8B, 8C, 8D and 8E are rear elevation views of the baler, shown with the rear door of the bale chamber removed, illustrating the operation of the tying and knotting system.
Figure 8C:
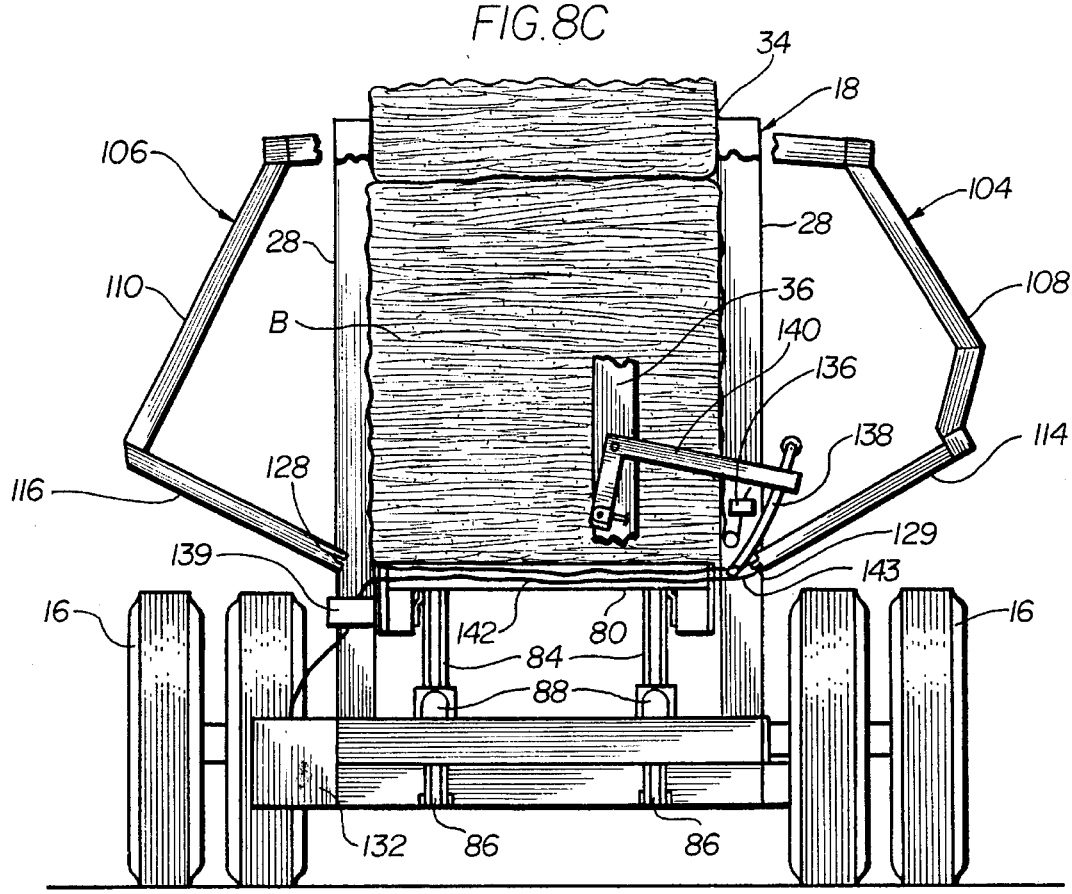
Figure 8D:
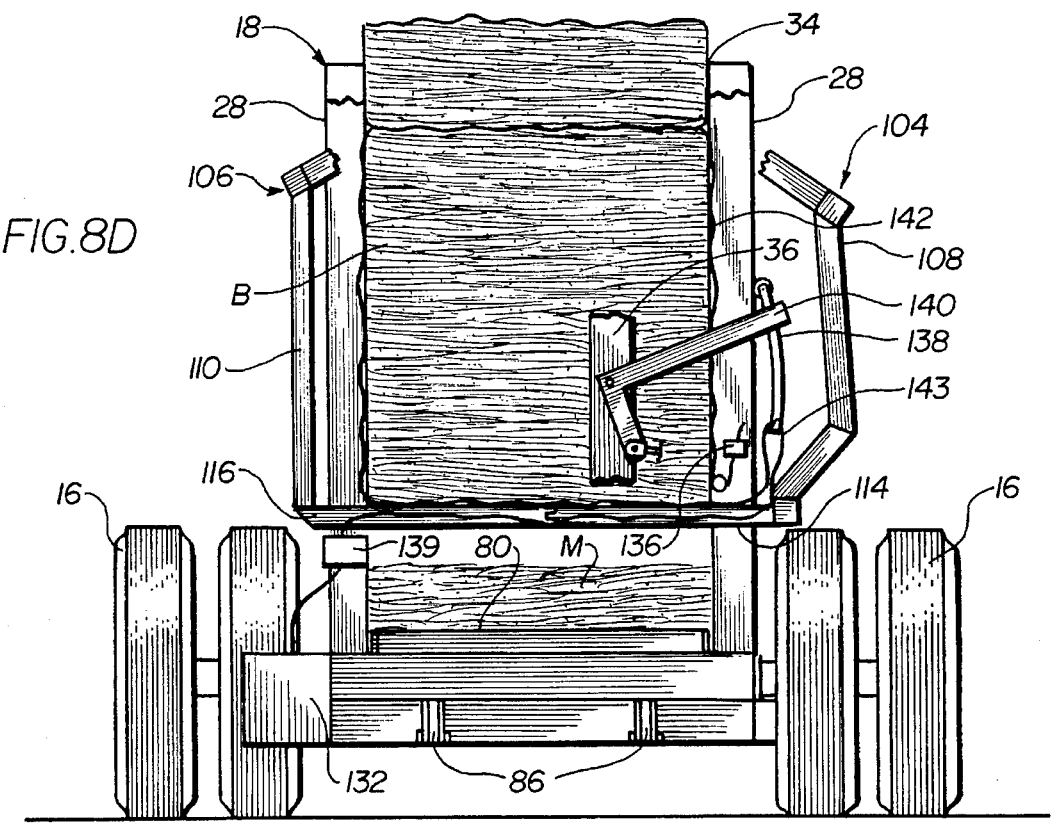
Figure 8E:
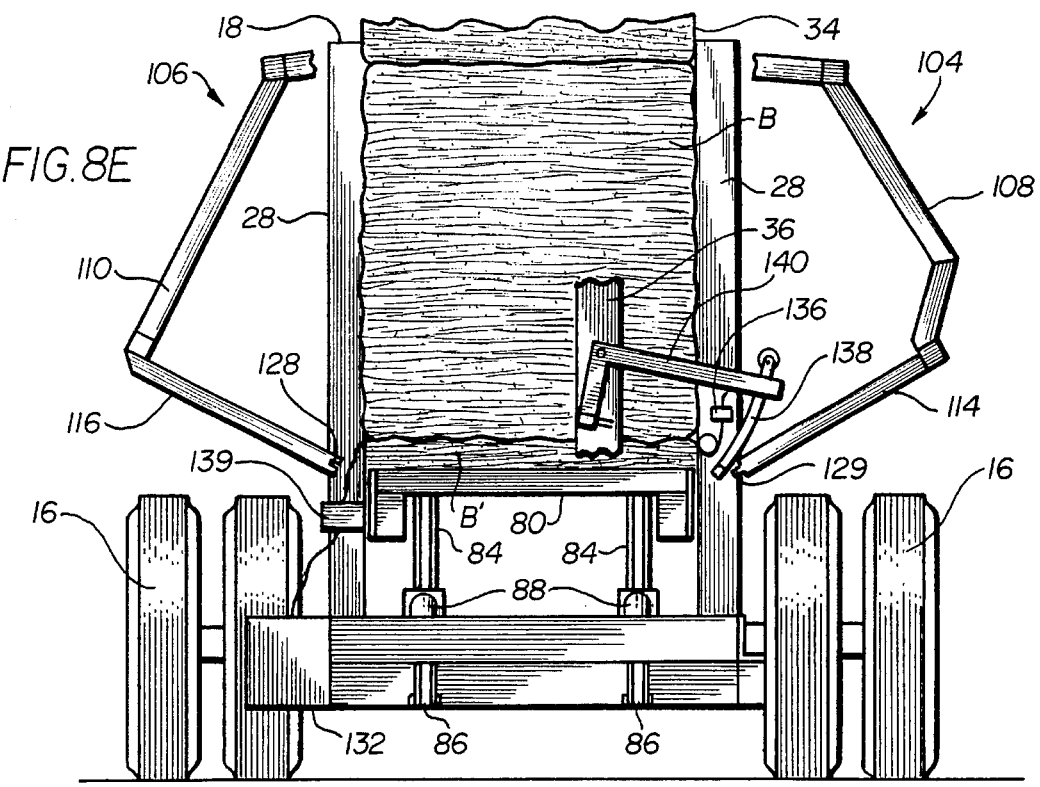

Next, a set of twine transfer fingers 131 transfer twine loops 143 to the parallel twine hooks 138. As drive arms 140 rotate upwardly, as best illustrated in FIG. 9, cam follower 135 presses against cam 133 which forces twine hooks 138 to rotate carrying twine loops 143 across bill hooks 137 to twine disk 136. Bill hooks 137 then rotate, and a knife (not shown) cuts twine loops 143 and a knot is tied with each loose end of the twine strands 142 that surround the completed bale B in a manner well known in the art. Twine disk 136 continues to grasp the loose ends of the cut twine loops, thus forming twine strands 142 for the new bale B' being formed, as illustrated in FIG. 8E.

The operation of a full compression cycle of baler 10 will now be described with reference to FIGS. 1–6. The illustrated cycle begins with supporting structure 100 closed in a support position and compressing mechanism 20 fully retracted as shown in FIG. 5. As baler 10 moves along the field, the windrow of baling material on the surface is lifted by pick-up mechanism 22 and deposited as mat M (FIG. 2) onto conveyor 26. When the mat has travelled approximately 8 feet along conveyor 26, delivery mechanism 30 is triggered and sweep 64 carries a segment of mat M rapidly rearward and deposits it onto the surface of compressing ram 80. Delivery mechanism 30 accelerates and decelerates rapidly having an average velocity that is approximately four times the velocity of conveyor 26.

AS delivery mechanism 30 and, subsequently, compressing ram 80 operate, conveyor 26, pick-up 22 and clamping rollers 38 and 40 continue at a constant velocity forming the next mat of material to be baled. According to initial tests, a conveyor velocity of approximately 2/3 the ground velocity of the baler has demonstrated best results for typically sized windrows. Next, ram 80 begins its compression stroke and supporting gates 104 and 106 open, as described above. Ram 80 then compresses the loose material onto the bottom of bale B within bale chamber 18, gate sections 104 and 106 close to support the bottom layers of bale B and ram 80 returns to its retracted position.

In the illustrated embodiment, each of the baler subsystems described above are hydraulically actuated. In order to allow baler 10 to achieve a preferred maximum ground speed of four miles per hour, a complete cycle must be performed in approximately 2.0 seconds, or in approximately 11 feet of ground travel. Accordingly, a main hydraulic pump rated at 90 gallons per minute (not shown) is required to provide the desired speed of operation.

The sequence of actions of conveyor 26, delivery mechanism 30, compressing mechanism 20 and supporting structure 100 can be controlled by any of a number of available methods. For example, conveyor 26 can be provided with limit switches that trigger when mat M on conveyor 26 has reached its full length. The limit switch can be wired to a solenoid that opens the hydraulic valve controlling the flow of hydraulic fluid to delivery cylinder 72 to begin the rearward movement of sweep mechanism 64. Another limit switch can be provided on delivery mechanism 30 to trigger compressing mechanism 20 in a similar fashion. Alternatively, limit switch signals could be sent to a microprocessor-based control system in order to provide more advanced control capabilities.

The bale formation and discharge cycle is best shown in FIGS. 8A–8E and FIGS. 10–12. As compressing ram 80 compacts layers of material within the bale chamber 18, the remainder of bale B is pushed upward toward bale chamber outlet 34. When bale B is completed, tying and knotting system 130 is invoked to tie twine strands 142 around bale B. Thereafter, as successive layers of the next bale B' are formed, bale B is pushed out of bale chamber outlet 34 as shown in FIG. 8E. The weight of completed bale B within bale chamber 18 facilitates compression of new layers of forming bale B' minimally. More significantly, as discussed above, the adjustable taper of the interior walls 28 of bale chamber 18 can alter the resistance to movement of all material within bale chamber 18, thus altering the compression forces applied to successive layers of bale B'.

Figure 11:
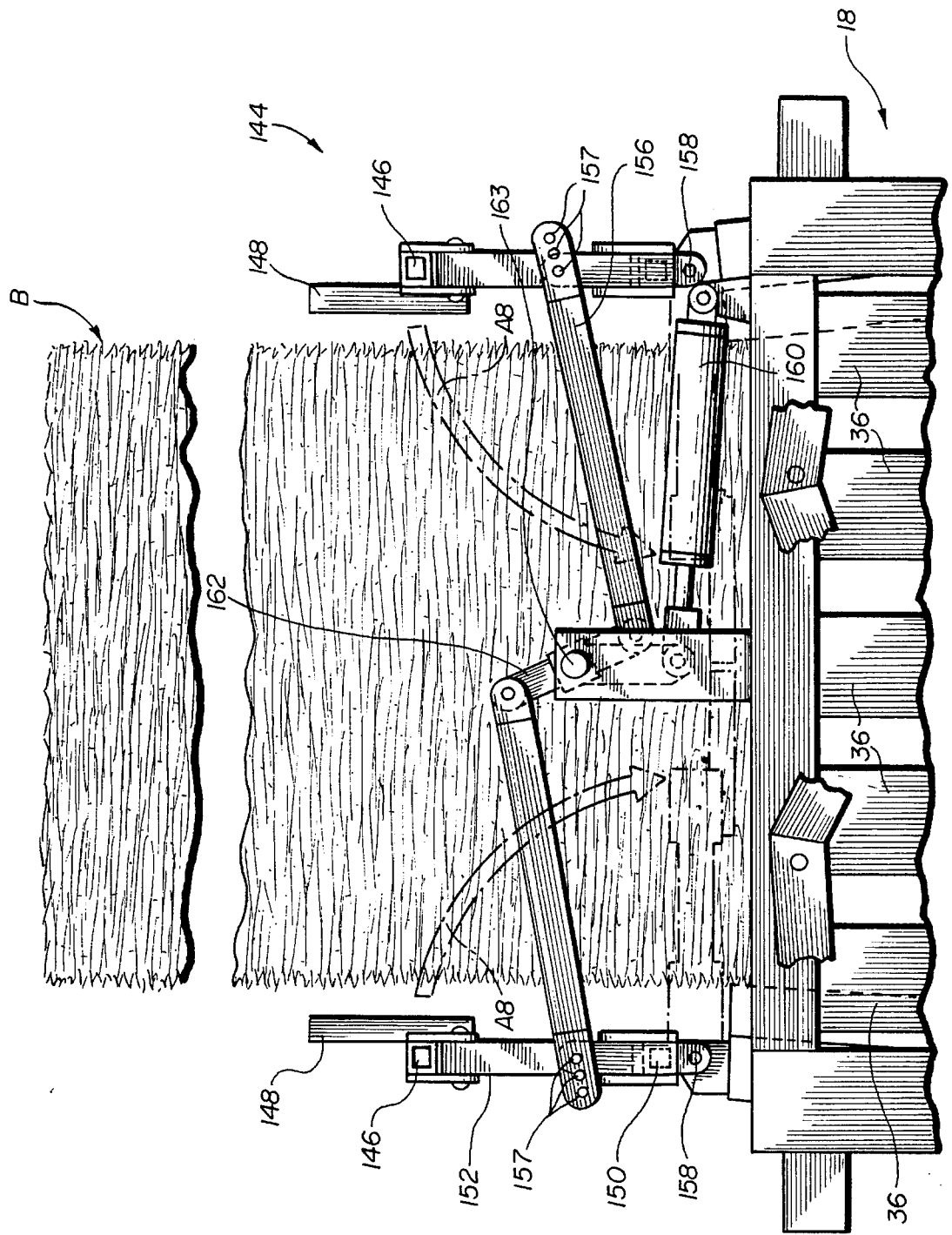
FIG. 11 is a partial front elevation view of the bale chamber illustrating the bale discharge mechanism in its stowed and operating configurations.
Figure 12:
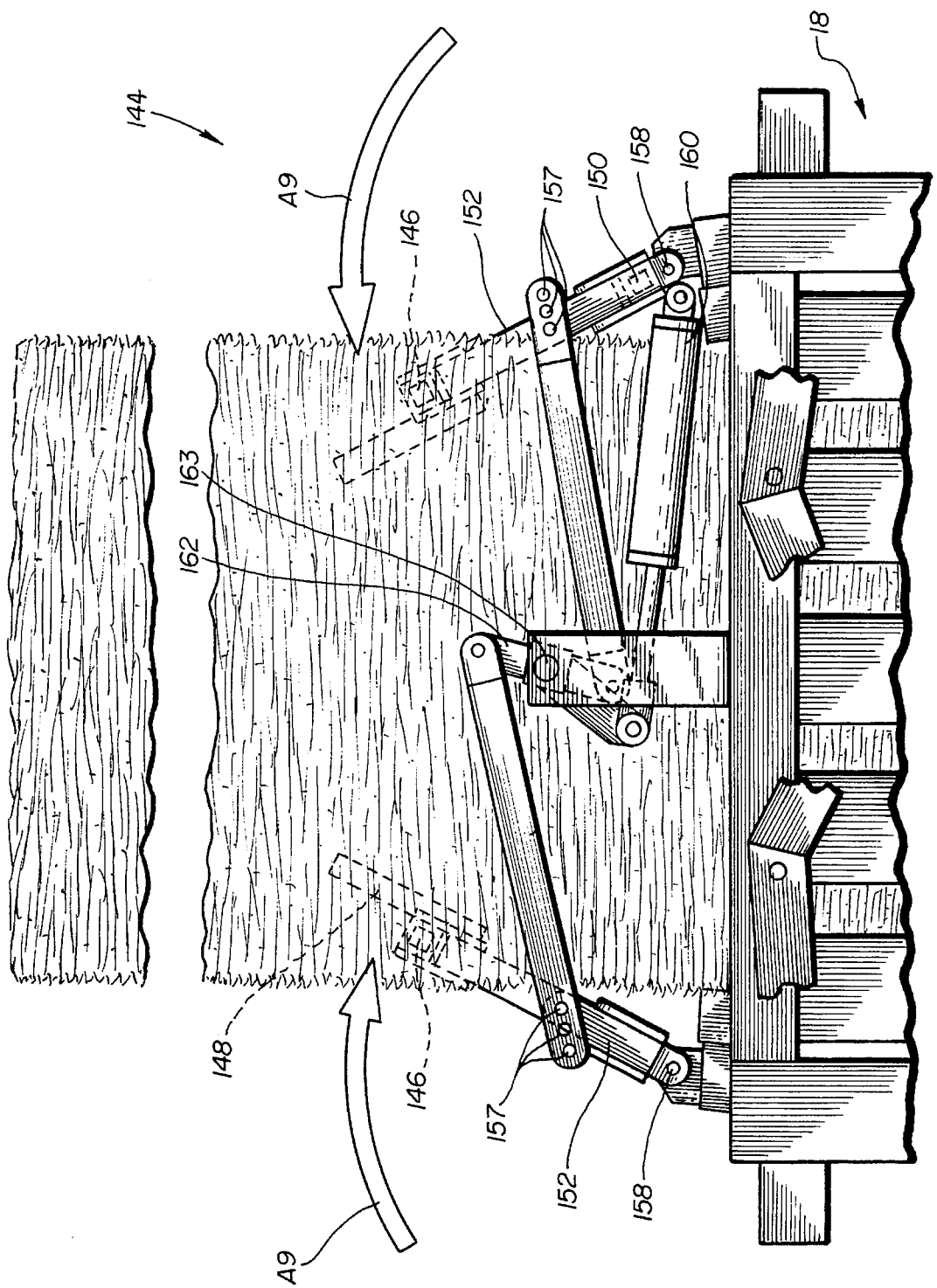
FIG. 12 is a partial front elevation view of the bale chamber illustrating the bale discharge mechanism in its operating configuration.

When completed bale B is pushed entirely out of bale chamber 18, a bale discharge mechanism 144 is activated to move the bale from the top of bale chamber 18 to the surface of the field. As illustrated in FIGS. 10–13, discharge mechanism 144 includes a pair of horizontal bars 146 positioned on either side of the completed bale to which are mounted a plurality of pads 148 for gripping the sides of bale B. Bars 146 are connected to lower horizontal bars 150 by a pair of links 152 and 154 located at the front and rear, respectively, of the bale chamber. With reference to FIG. 11, bars 150 are secured to a pair of cross links 156. Bars 150 are attached to the sides of the bale chamber at pivot points 158. Several mounting holes 157 are provided in cross links 156 to accommodate the taper adjustments of interior walls 28 of bale chamber 18 as illustrated in FIG. 6. Cross links 156 are connected by a pivoting link 162 driven by hydraulic cylinder 160. As best illustrated in FIG. 12, cylinder 160 exerts a force on link 162 such that link 162 rotates about pivot point 163 which causes the cross links (and thus bars 150) to pivot inwardly about point 158. Consequently, pads 148 tilt inwardly against the bales as indicated by arrows A9 of FIG. 12, to provide a clamping force. For illustrative purposes, pads 148 are shown with an exaggerated degree of tilt in FIG. 12. In operation, pads 148 will tilt no more than approximately 5–10 degrees toward bale B.

Figure 10:
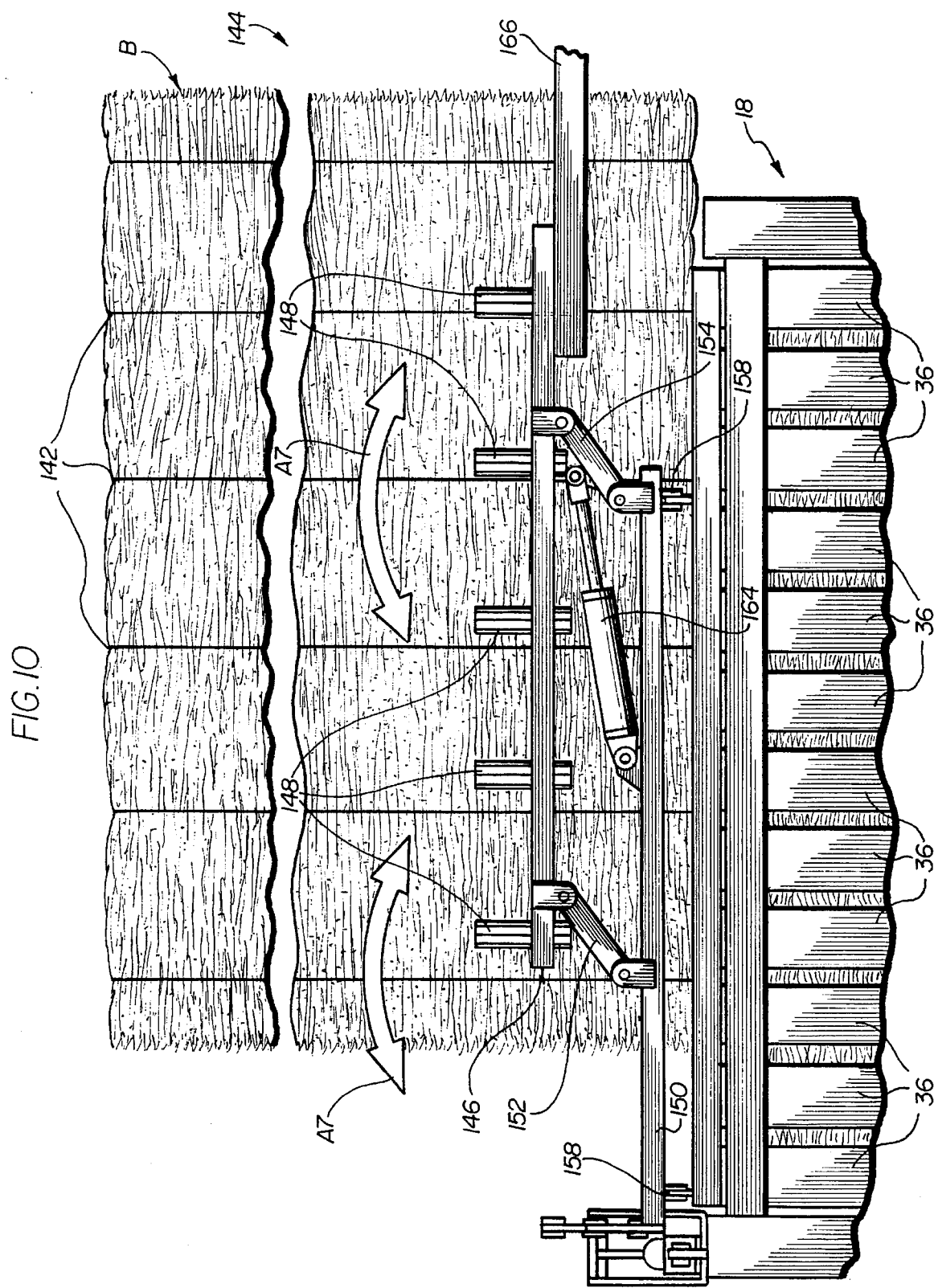
FIG. 10 is a partial side elevation view of the bale chamber of the baler illustrating the bale discharge mechanism.

Once bale B is clamped between pads 148, upward and rearward movement of bale B is provided by a pair of hydraulics cylinders 164 as illustrated in FIG. 10. When cylinders 164 are actuated, links 152 and 154 on both sides of bale B move in a circular arc towards the rear of bale chamber 18. As a result, bale B is lifted and moved rearward towards bale discharge ramp 166 as indicated by arrows A7. Through successive cycles of clamping and rearward movement, discharge mechanism 144 deposits bale B on discharge ramp 166 where the bale slides to the ground, as shown by arrow A10 in FIG. 13. Bale discharge ramp 166 can be equipped with a mechanism (not shown) for slowing the speed at which bale B slides down the ramp to minimize the possibility that bale B will be damaged when it makes contact with the surface.

Bale discharge mechanism 144 also provides restriction to upward movement of the first bale formed within bale chamber 18. As illustrated in FIG. 11, in this mode cross links 156 are disconnected and bale discharge mechanism 144 is pivoted about point 158 (in a manner indicated by arrows A8) completely downward across the bale chamber outlet 34 and secured to sides of bale chamber 18 by a clamp (not shown). When the first bale reaches a desired density, discharge mechanism 144 is pivoted back its upright position, links 156 are reconnected and successive bales are formed continuously as described above.

While the invention has been described with respect to certain preferred embodiments, it is to be understood that the invention is capable of numerous changes, modifications and rearrangements without departing from the scope or spirit of the invention as defined in the claims.

I claim:

1. An apparatus for baling material comprising:
   a bale chamber having a material receiving opening for receiving balable material from beneath said bale chamber, said material receiving opening located at a lower portion of said chamber and said bale chamber having a bale discharge opening located at an upper portion of said chamber for discharge of a bale formed in said bale chamber;
   delivery means for delivering balable material beneath the bale chamber and adjacent the material receiving opening of said bale chamber;
   periodic compression means for periodically compressing balable material adjacent said material receiving opening into the bale chamber to thereby compress material within the bale chamber to form a bale of material and for periodically retracting to a position spaced apart from the material receiving opening to permit material to be conveyed adjacent the material receiving opening of the bale chamber by said delivery means; and
   selectively actuable supporting means for supporting the material contained in said bale chamber and located at or above said material receiving opening of said bale chamber during retraction of the compression means, said supporting means being retractable to a non-support position during compression by the compression means.

2. The apparatus of claim 1 wherein said delivery means includes a gathering means for gathering balable material from a surface and forming a mat of balable material that is essentially parallel with the surface.

3. The apparatus of claim 2 wherein said delivery means includes conveying means for transporting said mat of balable material towards said bale chamber.

4. The apparatus of claim 3 wherein the delivery means further includes a sweeping mechanism having at least one row of parallel prongs for engaging the mat of baling material on the conveying means.

5. The apparatus of claim 4 wherein the parallel prongs of said sweeping mechanism pivots downwardly for engaging the mat of baling material positioned on the conveying means during a delivery stroke of said delivery means and pivots upwardly away from the conveying means during a retraction stroke of said delivery means.

6. The apparatus of claim 5 wherein the parallel prongs remain pivoted upwardly away from the conveying means due to an upward force exerted by the movement of the mat of baling material on the conveying means.

7. The apparatus of claim 4 wherein said delivery means includes clamping means adjacent to said conveying means for clamping said mat of balable material to provide clean separation when said mat is engaged by said sweeping mechanism.

8. The apparatus of claim 7 wherein said clamping means comprises a pair of driven rollers rotating at approximately the same rate as said gathering means.

9. The apparatus of claim 1 further comprising a synchronizing means for synchronizing the operation of the compressing means and the delivery means so that the continuous mat of fibrous material is delivered to the compression chamber while the compressing means is in a retracted position.

10. The apparatus of claim 1 further comprising synchronizing means for synchronizing the operation of the supporting means and the compressing means so that the supporting means opens after the compressing means begins its compression stroke and closes before the compressing means begins its retraction stroke.

11. The apparatus of claim 1 wherein the supporting means includes a lower supporting member comprising a plurality of fingers for supporting the bottom layers of the bale being formed within the bale chamber.

12. The apparatus of claim 11 wherein the compressing means has a slotted upper surface that allows for the insertion of the lower supporting members of the supporting means when the compressing means is at a maximum upward point of the compression stroke.

13. The apparatus of claim 11 wherein the lower supporting members of said supporting means includes twine engaging means for looping parallel strands of twine around the exterior of bales formed within the bale chamber.

14. The apparatus of claim 13 further comprising knotting means for tying the loose strands of twine around the exterior of the bale when the bale reaches a desired height.

15. The apparatus of claim 1 further comprising a selectively actuable restraining means located at the bale discharge opening of the bale chamber for restraining the upward movement of a first bale formed within in the bale chamber.

16. The apparatus of claim 15 wherein completed bales within the bale chamber provide resistance to the upward movement of successive bales formed within the bale chamber.

17. The apparatus of claim 1 further comprising knotting means for tying a bale located within the bale chamber when the bale reaches a desired height.

18. The apparatus of claim 1 further comprising a bale discharge means located adjacent to the bale discharge opening of the bale chamber for moving a completed bale from the bale discharge opening and conveying said completed bale to the surface.

19. The apparatus of claim 18 wherein said discharge means further comprises a bale ramp having an upper end attached to the rear of the bale chamber and a gradual slope toward the surface for discharging the completed bale on the surface.

20. The apparatus of claim 1 wherein the sides of the bale chamber are adjustably tapered inwardly from bottom to top.

21. A baling apparatus for bailing material comprising:
   a bale chamber having a material receiving opening for receiving balable material from beneath said bale chamber, said material receiving opening located at a lower portion of said chamber and said bale chamber having a bale discharge opening located at an upper portion of said chamber for discharge of a bale formed in said bale chamber;

a conveyor positioned between the bale chamber and the material to be baled for transporting a mat of baling material toward the bale chamber;

a conveyor sweep mounted above the conveyor for engaging a segment of the mat of baling material on the conveyor and carrying the segment to an area adjacent to the material receiving opening of the bale chamber;

a compression ram positioned adjacent to the material receiving opening of the bale chamber, said compression ram compresses the baling material adjacent to the material receiving opening into the bale chamber thereby compressing material within the bale chamber to form a bale of material therein; and a moveable supporting gate positioned at or above the material receiving opening of the bale chamber for supporting the material contained in the bale chamber having an actuator for opening the supporting gate during the compression stroke of the compression ram.

22. The apparatus of claim 21 further comprising a material gathering mechanism adjacent to a surface on which baling material lies comprising a rotating drum to which is mounted a plurality of tines for gathering the material lying on the surface.

23. The apparatus of claim 22 further comprising a pair of driven rollers mounted above and below, respectively, said mat of baling material and adjacent to said gathering mechanism, wherein said rollers are driven at the same rate of rotation as said gathering mechanism.

24. A method for forming bales of material comprising the steps of:

forming and transporting a mat of baling material from an area containing the material;

periodically separating and delivering a segment of the mat of baling material to an area beneath a bale chamber and adjacent a material receiving opening of said bale chamber and thereafter;

upwardly compressing each said segment of baling material into the bale chamber through the material receiving opening of the bale chamber, the compression forming a substantially horizontal compressed layer of fibrous material that becomes part of the bale; and supporting from below any compressed layers in the bale chamber after completion of each compressing step.

25. The method of claim 24 further comprising the step of restraining the movement of the first bale being formed within the bale chamber at the top of the bale chamber.

26. The method of claim 24 further comprising the step of tying the bale in the bale chamber when the bale reaches a desired height, and discharging the completed bale in the field with the layers of fibrous material of the bale in the field being horizontal.

27. The method of claim 26 further comprising the step of beginning the baling of a new bale of fibrous material within the bale chamber after the tying of a last completed bale while the last completed bale is still in the bale chamber.

* * * * *